United States Patent

Taylor et al.

(10) Patent No.: US 9,898,748 B1
(45) Date of Patent: Feb. 20, 2018

(54) DETERMINING POPULAR AND TRENDING CONTENT CHARACTERISTICS

(75) Inventors: Brett R. Taylor, Bainbridge Island, WA (US); David A. Killian, Seattle, WA (US); Peter F. Hill, Seattle, WA (US); Ameet N. Vaswani, Seattle, WA (US); Ivan King Yu Sham, Seattle, WA (US); Ranganath Atreya, Kirkland, WA (US); Samuel J. Young, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1510 days.

(21) Appl. No.: 13/599,870

(22) Filed: Aug. 30, 2012

(51) Int. Cl.
*G06F 15/16* (2006.01)
*G06Q 30/02* (2012.01)
*G06Q 10/04* (2012.01)

(52) U.S. Cl.
CPC ......... *G06Q 30/0201* (2013.01); *G06Q 10/04* (2013.01); *G06Q 30/0202* (2013.01)

(58) Field of Classification Search
CPC ................ G06F 17/30893; G06F 17/3053
See application file for complete search history.

(56) References Cited

U.S. PATENT DOCUMENTS

| | | | |
|---|---|---|---|
| 6,963,850 B1 | 11/2005 | Bezos et al. | |
| 8,073,850 B1 | 12/2011 | Hubbard et al. | |
| 2009/0228357 A1* | 9/2009 | Turakhia | G06F 17/30867 705/14.53 |
| 2011/0055386 A1* | 3/2011 | Middleton | H04L 67/125 709/224 |
| 2011/0314007 A1* | 12/2011 | Dassa et al. | 707/723 |
| 2012/0233212 A1* | 9/2012 | Newton et al. | 707/774 |

* cited by examiner

*Primary Examiner* — Philip Chea
*Assistant Examiner* — Mohammed Ahmed
(74) *Attorney, Agent, or Firm* — Knobbe, Martens, Olson & Bear LLP

(57) ABSTRACT

Features are disclosed for analyzing requests for network accessible content, including but not limited to web pages, to determine which topics and other characteristics are popular or are gaining in popularity ("trending"). Content items or sources may be profiled to determine characteristics that two or more content items or sources may have in common. Content requests from multiple client devices may be tracked and analyzed to determine the trending or popular characteristics. Data feeds or reports regarding the summarized content requests may be generated and distributed to content servers, advertisers, and other entities. The data feeds may be used to tailor content, such as by highlighting or featuring content associated with the most-requested content characteristics, or utilizing demographic data to tailor content for different users.

16 Claims, 6 Drawing Sheets

DETERMINING POPULAR AND TRENDING CONTENT CHARACTERISTICS

BACKGROUND

Computing devices, such as personal computers, tablet computers, mobile phones, or other devices, often request content from other computing devices over a network. In a common application, the computing device operated by a requesting user is referred to as the client, and the computing device or system operated by the content provider that responds to the request is the server. A client and server may communicate over an intranet, the Internet, or any other communication network. Clients receive and process content (e.g., web pages) from content servers, either directly or through intermediary systems, such as proxy servers.

Various services exists for measuring the popularity levels of particular web sites, web pages, search terms, and topics. These services rely on various sources of behavioral data, such as search engine traffic, blog posts, and Twitter posts, to gauge the popularity of particular topics and content items. While such services are useful, they frequently do not provide a sufficiently reliable, useful, and timely indication of the topics and content items that currently gaining in popularity.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
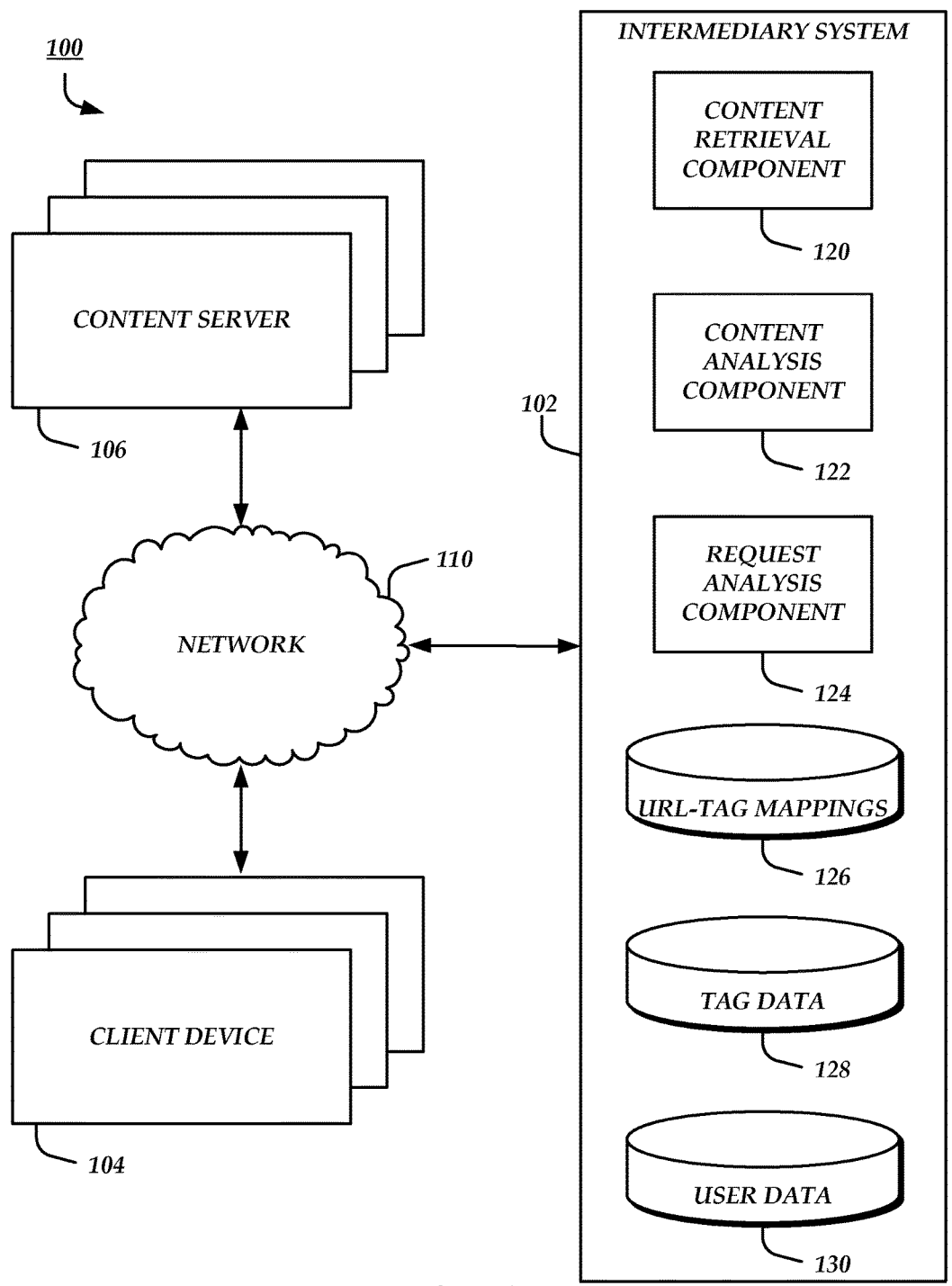
FIG. 1 is a block diagram of an illustrative content delivery environment including multiple client devices, an intermediary system, and multiple content servers.

The present disclosure is directed to analyzing requests for network accessible content, including but not limited to web pages. Specifically, the disclosure relates to summarizing requests for content items based on characteristics of the content items or content sources to identify which content characteristics are popular or are gaining in popularity ("trending"), the rate at which the content characteristics are gaining in popularity, and the like. The characteristics may include the topic, general subject matter, content format, edit date, and the like. A system may profile content items and sources to determine characteristics that two or more content items or sources may have in common. For example, content pages from two different news content servers may have some characteristics in common (e.g.: both relate to the same topic, such as news content), while other characteristics may be different between the two (e.g.: entertainment news vs. political news). Content requests from multiple client devices may be tracked. Request data may be analyzed to determine which characteristics are trending or are associated with a higher volume of requests than other characteristics within a category, other characteristics overall, and the like.

Additional aspects of the disclosure relate to generating and distributing reports or data feeds summarizing the requests for content associated with various characteristics. For example, a data feed regarding the most requested news subject within a period of time may be generated and transmitted to news content servers. In another example, content servers may request reports on-demand, or the reports may be provided according to a schedule or in response to some triggering event. Advantageously, the reports or data feeds may summarize requests for content items hosted by content servers separate from the content server which requested or received the report. Such cross-domain content request summarization can provide the content server with data about requests for content items which the content server does not have knowledge of. Content servers may use such reports to tailor their own content, such as by highlighting or otherwise featuring content associated with the most-requested content characteristics. Demographic data may also be included in the reports, and content servers may utilize such demographic data to tailor their content to different users based on the demographics of the users.

Although aspects of the embodiments described in the disclosure will focus, for the purpose of illustration, on relationships and interactions between client devices and content servers through an intermediary system, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

Content Delivery Environment

FIG. 1 illustrates an example content delivery environment 100 in which content request data may be tracked, analyzed, and acted upon. In some embodiments, the content may include content pages, such as web pages and other documents. The content pages may include any combination of text, images, videos, animations, interactive features, and the like.

A content delivery environment 100 can include an intermediary system 102, any number of client devices 104, and any number of content servers 106. The various systems may communicate with each other via a communication network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The intermediary system 102 can be any computing system that serves as an intermediary between a client device 102 and content servers 106. For example, the intermediary system 102 can be an intelligent proxy server, a system operated by an internet service provider (ISP), or some other device or group of devices that retrieve content on behalf of client devices 104. Illustratively, the intermediary system 102 of FIG. 1 is configured to serve as a proxy between client devices 104 and content servers 106. The intermediary system 102 can include a number of components, such as a content retrieval component 120, a content analysis component 122, a request analysis component 124, a URL-tag mapping data store 126, a tag data store 128, and a user data store 130. In some embodiments, the intermediary system 102 may include additional or fewer components than illustrated in FIG. 1. For example, the intermediary system 102 may not include a content retrieval component 120, or may include or otherwise be associated with various additional computing resources, such as content delivery network (CDN) systems, domain name system (DSN) servers, and the like.

The intermediary system 102 may include multiple computing devices, such as computer servers, logically or physically grouped together. The components of the intermediary system 102 can each be implemented as hardware, such as a server computing device, or as a combination of hardware and software. In addition, the components of the intermediary system 102 can be combined on one server computing device or separated individually or into groups on several server computing devices. In some embodiments, the intermediary system 102 can include multiple instances of a single component, etc.

The client devices 104 can correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 104 may be configured with a browser application to communicate via the network 110 with other computing systems, such the intermediary system 102 or content servers 106, and to request, receive, process, and display content.

The content servers 106 can correspond to logical associations of one or more computing devices for hosting content and servicing requests for the hosted content over the network 112. For example, a content server 106 can include a web server component corresponding to one or more server computing devices for obtaining and processing requests for content (such as content pages) from the client device 102, the intermediary system 104, or other devices or service providers. In some embodiments, one or more content servers 106 may be associated with a CDN service provider, an application service provider, etc.

In operation, one or more client computing devices 104 may be associated with an intermediary system 102. For example, a client computing device 104 may utilize proxy and caching services provided by the intermediary system 102. A user of the client device 104 may initialize a browser application and transmit a request for a content page, such as a web page. Due to the association with the intermediary system 102, the request may be transmitted to the intermediary system 102 rather than directly to the content server 106 of the content page. The content retrieval component 120 or some other component of the intermediary system 102 can retrieve the content page from a content server 106 or some other source of the content page, such as a CDN system.

The intermediary system 102 may process the content page prior to transmitting it to the client device 104. For example, the content retrieval component 120 may include a network browser component or some other content rendering engine to partially or completely render the page. The rendered content may then be transmitted to the client device 104. In some embodiments, the content rendering engine may be in communication with a browser application on the client device 104, such that processing at the content rendering engine is automatically reflected at the browser of the client device 104. One example of a content rendering engine executing on an intermediary system 102 or other network computing component, and the browsing configurations and processing that facilitate usage of the content rendering engine, is described in U.S. patent application Ser. No. 13/174,589, the disclosure of which is hereby incorporated by reference.

The content retrieval component 120 or some other component of the intermediary system 102 may store data regarding some or all content requests received from client devices 104. The data may include a record of which content was requested, the date and time of the request, and the subject matter of the requested content, among other information. In some embodiments, the data may be stored regarding characteristics of the client devices 104 that have submitted the requests, such as form factor (e.g.: mobile phone, tablet, desktop computer), browser type, and network connection. Some content items may be associated with previously determined profiles that include information classifying the subject matter, topic, or source of the content into categories, or "tags." The tags that apply to a particular content item may be determined via the URL-tag mapping data store 126. A request count or some other data indicating a received request related to each tag associated with the content may be updated in the tag data store 128.

If the content item has not been previously associated with tags, the content analysis component 122 or some other component of the intermediary system 102 may analyze and associate tags with the content item. The intermediary system 102 may maintain a repository of tags in a tag data store 128. The tag data store 128 may include a predetermined set of tags, such as news, shopping, entertainment, and the like. More specific tags may be created, such as financial news and world news. Content items may be associated with the tags, or "tagged," by storing data in the URL-tag mapping data store 126. For example, a financial news article may be tagged as relating to news, and also tagged more specifically as financial news. More detailed tags may be created, such as tags for specific individuals or entities mentioned in a content item. In the previous example, the financial news article may be further tagged as relating to a specific company. Additional tags may be created regarding characteristics of content other than subject, such as source, edit date, content type (e.g.: text, image, video, sound, Flash), among others. Moreover, the tags need not be predetermined, but may instead be dynamically determined at the time the content item is analyzed by the content analysis component 124. For example, if a financial news article mentions an entity that does not have a corresponding tag in the tag data store 128, a new tag may be created, saved in the tag data store, and also associated with the content item by saving data in the URL-tag mapping data store 126. Useful tags can also be identified by analyzing search query submissions to one or more Internet search engines.

Demographic data about individual users or groups of users may be stored in a user data store 130. The demographic data stored in the user data store 130 may include gender, age, geographic location, content request history, and the like. Such demographic data may be received from the individual users, for example when users set up a user account with the intermediary system 102. In addition to demographic data, data regarding the client devices 104 used by users to submit content requests may be stored in the user data store 130 or some other data store. Such device-specific data can include data regarding various device characteristics such as form factor, browser type, and network connection, among others. Device-specific data may be determined from information in content requests (e.g.: by inspecting the User-Agent header), or may be provided by users when setting up user accounts. The request analysis component 124 may use demographic and/or device data to determine which tags are most likely or most often associated with content requests made by users with various demographic characteristics or devices. For example, the request analysis component 124 may determine which tags are most often associated with content requested by males between the ages of 18 and 35 in New York using mobile phones.

Content servers 106 may receive the results of the analysis performed by the request analysis component 124. Content servers 106 may use the results to feature popular or trending content, as determined by tags associated with a high or rapidly increasing number of content requests, or to tailor their own content for specific user demographics. In some cases, data regarding trending tags may be more desirable than data regarding tags which are currently popular, because the rate of change or "acceleration" of the popularity may be considered to be a better indicator of future popularity than the current actual popularity level. For example, content providers and advertisers may be most interested in finding out about a topic that is rapidly gaining in popularity but whose popularity has not yet peaked. The content provider or advertiser may alter their content offerings or strategies to emphasize the trending topic over some other topic that is more popular at the time.

The content servers 106 may receive data regarding tag popularity and trends on-demand, as part of a regular or irregular schedule, or as a continuous data feed. For example, a content server 106 may receive a general report each day regarding the most popular tags over the previous week and day. The same content server 106 or a different content server 106 may receive a separate report, on demand, regarding the most popular tags for males between the ages of 18-35 over the previous hour. Content servers 106 may implement automated systems to update their content to highlight content associated with popular tags. In some embodiments, content servers 106 may customize content for users based on demographic information associated with the requesting user in order to feature content that may be more popular with such users than other content that may be popular in general. Demographic data regarding client devices 104 may be used to reformat content for different form factors, browsers, and other characteristics of client devices 104 used by users likely to request certain content from the content server 106.

Content items may change substantially over a short period of time, or even every time the item is retrieved. Such items may not be good candidates for the content analysis and tagging methods described herein. In some embodiments, providers of dynamic content (e.g.: content that changes substantially over a short period of time) may still be tagged with general tags, though more specific tags may not be appropriate. For example, the landing page of a news web site may be associated with a general "news" tag, while individual articles which are featured on the landing page and linked from the landing page may be tagged with more specific tags, such as those related to individual entities and the like.

As will be apparent, the content request analysis features described herein can also be implemented without the use of a proxy server or other intermediary system 102. For example, a browser or some other component of a client device 104 can be designed or configured to communicate with a designated (non-intermediary) request analysis server that supplies information to content servers 106 regarding popular tags, as described above. In such embodiments, a user may install a toolbar or other browser component in the client device. The toolbar may then monitor user content requests and submit the data to a request analysis server. Optionally, the browser itself may be configured to automatically transmit content request data to a request analysis server.

Content Request Interactions

Figure 2:
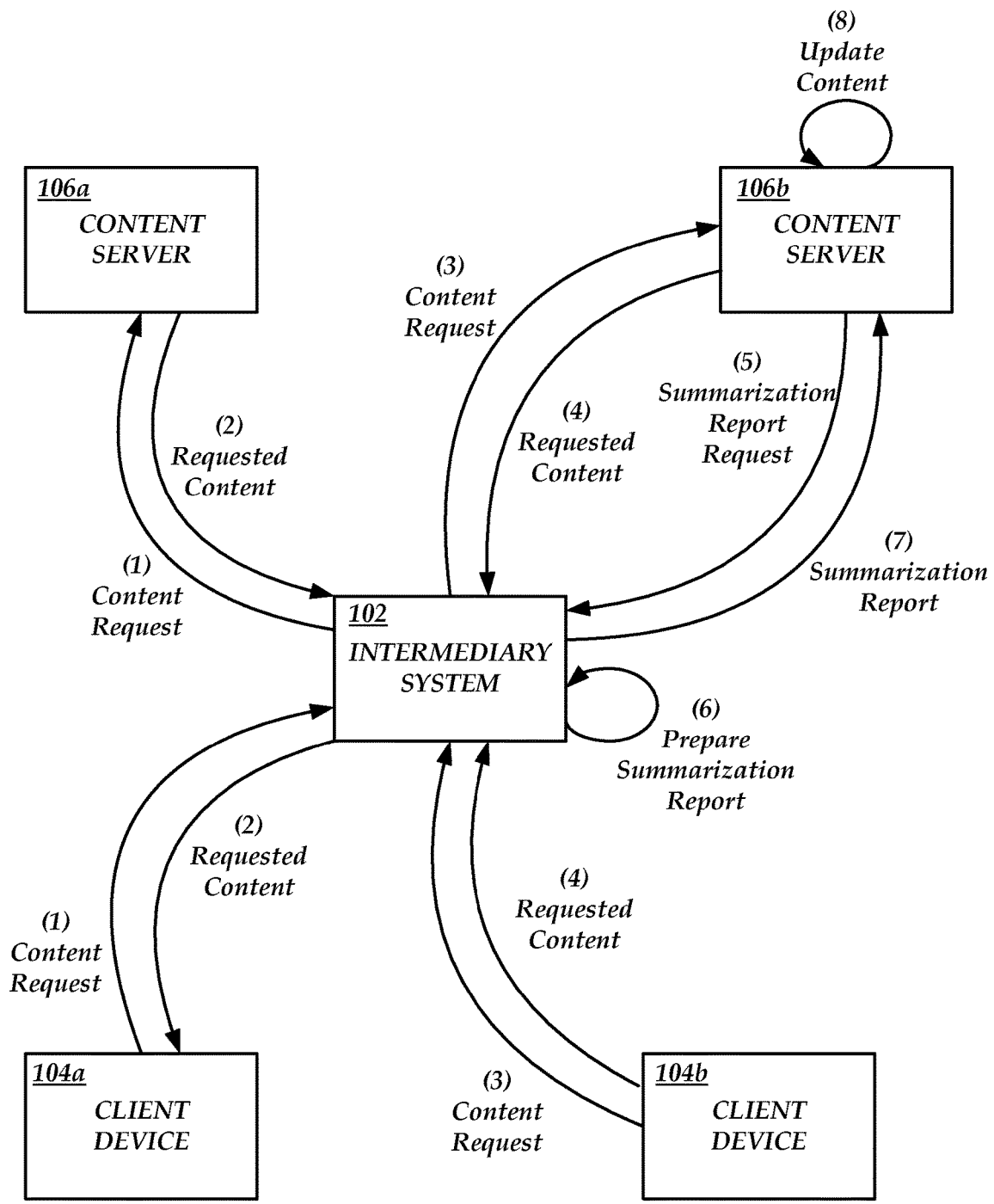
FIG. 2 is a block diagram of illustrative communications and data flows between client devices, an intermediary system, and content servers.

FIG. 2 illustrates interactions and data flows between client devices 104a, 104b, an intermediary system 102, and content servers 106a, 106b regarding content requests. FIG. 2 further illustrates interactions between an intermediary system 102 and a content server 106b regarding reports summarizing content requests.

A client device 104a may transmit a request for content to an intermediary system 102 at (1). The intermediary system 102 may then request the content on behalf of the client device 104 from the corresponding content server 106a, and return the requested content to the client device 104a at (2). At some point subsequent to receiving the content request, the intermediary system 102 may update the tag data store 128. As described in detail below with respect to FIG. 4, the intermediary system 102 may determine which tags apply to the requested content via the URL-tag mapping data store 126. If there is no tag associated with the requested content, the intermediary system 102 may process the requested content after receiving it from the content server 106a, and associate existing tags with the content or create new tags based on the requested content.

A different client device 104b may transmit a content request to the intermediary system 102 at (3). The intermediary system 102 may request the content from the appropriate content server 106b on behalf of the client device 104b, as described above with respect to client device 104a. The intermediary system 102 may return the requested content to the client device 104b at (4). The intermediary system 102 may also determine which tags apply to the requested content, and update the request data for the tags.

A content server 106b may request a content request summarization report from the intermediary system 102 at (5). The content server 106b may make such a request on demand, such as at the discretion of a system administrator, or in response to some triggering event. In some embodiments, no request for the content request summarization report is needed, but rather the intermediary system 102 generates and transmits the report at its own initiation, such as on a schedule or in response to some other triggering event.

The intermediary system 102 can prepare the content request summarization report at (6). As described in detail below with respect to FIG. 5, the intermediary system 102 can analyze data regarding requests for content associated with various tags from the tag data store 128, and potentially user demographic data or device data from the user data store 130 to generate the content request summarization report. The report may be a list of tags associated with the most content requests, or the report may contain other information, such as counts, percentages, rankings, data regarding demographic groups, and the like. In some embodiments, the report or data feed may highlight tags that are rapidly gaining in popularity but are not yet very popular. Such trending tags may be used by content servers to identify which topics are likely to be popular at some point in the near future so that the content servers may modify their own content offerings accordingly. Advantageously, the report may include tags and content request summarizations related to content items hosted by content servers 106 separate from the content server 106b which requested the report. Such cross-domain content request summarization can provide the content server 106b with data about requests for content items which the content server 106 does not have knowledge of. The report may be transmitted or otherwise made available to the content server 106b at (7).

In some embodiments, the content request summarization report may include not only data regarding which topics are popular or trending, but also a network address or other identifier of a representative sample of the trending or popular topic. For example, the report may indicate the top five most popular or trending content pages associated with one or more of the topics in the report. The indication may be in the form of a list, a histogram or some other data structure or format. Content providers may utilize such data to inspect or link to the representative content. Additionally, the most popular or trending content associated with a tag may be indicated in conjunction with the various demographic and/or device data that is provided in the report. For example, the report may indicate the top three fastest trending pages associated with the local news in a particular location (e.g., users located in Los Angeles) for each of several different device types (e.g., mobile phones, tablets, and desktop computers).

Figure 3:
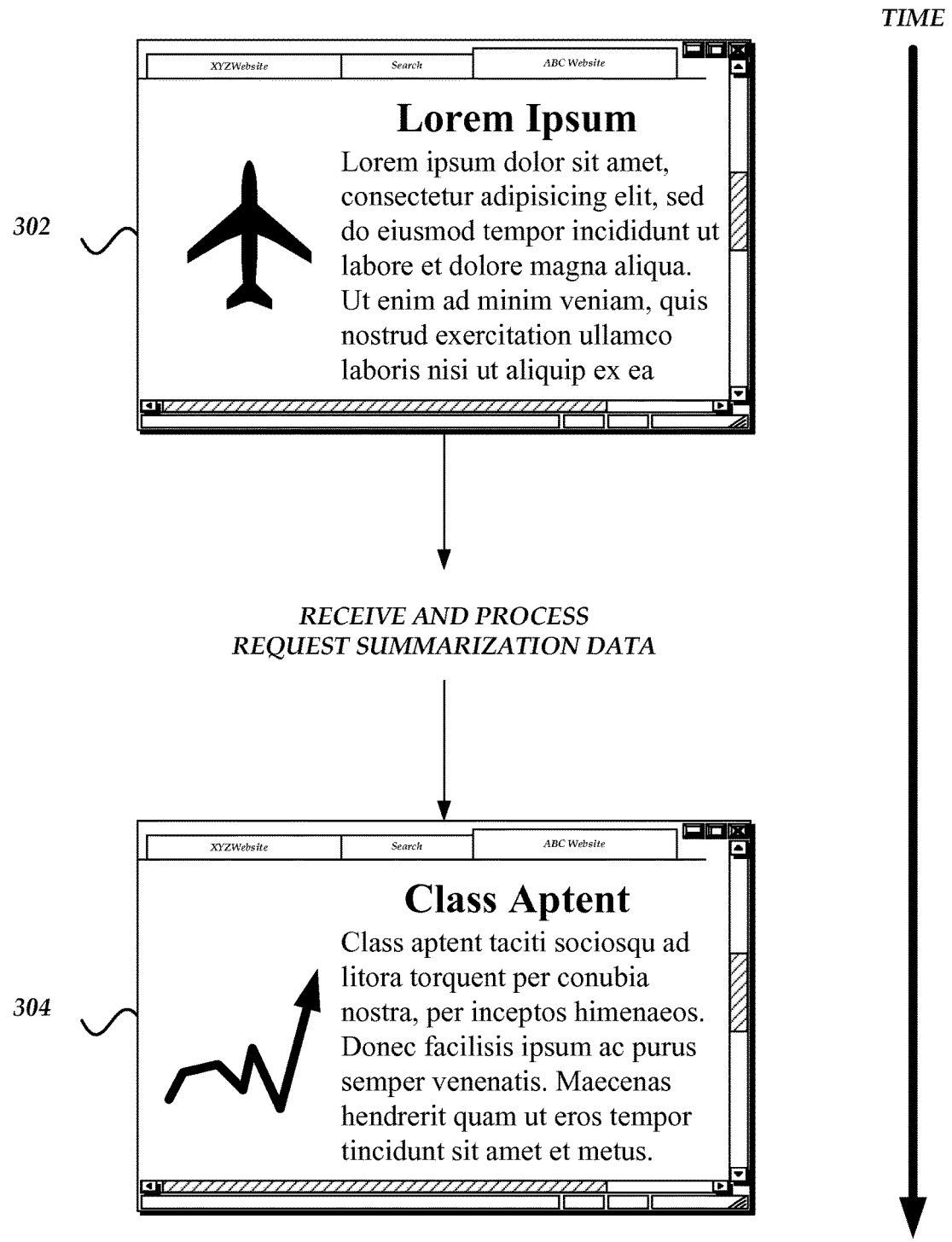
FIG. 3 is a user interface diagram of illustrative user interfaces before and after modification based on content request summarization data.

Upon receipt of the content request summarization report, the content server 106b can update some or all of the hosted content at (8). For example, the content server 106b may request and receive a report about the tags that are associated with the most content requests over a time period, such as the previous hour, 12 hours, 1 day, 1 week, etc. The report may indicate that certain tags are associated with a large number of requests, but the content server 106a may not currently be featuring content associated with those tags. In response, the content server 106b may alter its content offerings to feature content that is associated with the tags in the report or otherwise more popular or likely to be requested. FIG. 3 is a user interface diagram illustrating a change in content offered in response to receipt and processing of a content request summarization report. As seen in FIG. 3, the content server 106b may serve a content page 302 featuring one content item. Subsequent to receipt and processing of the report, the content server 106b may alter the content item to feature more popular content 304.

Content Request Processing

Figure 4:
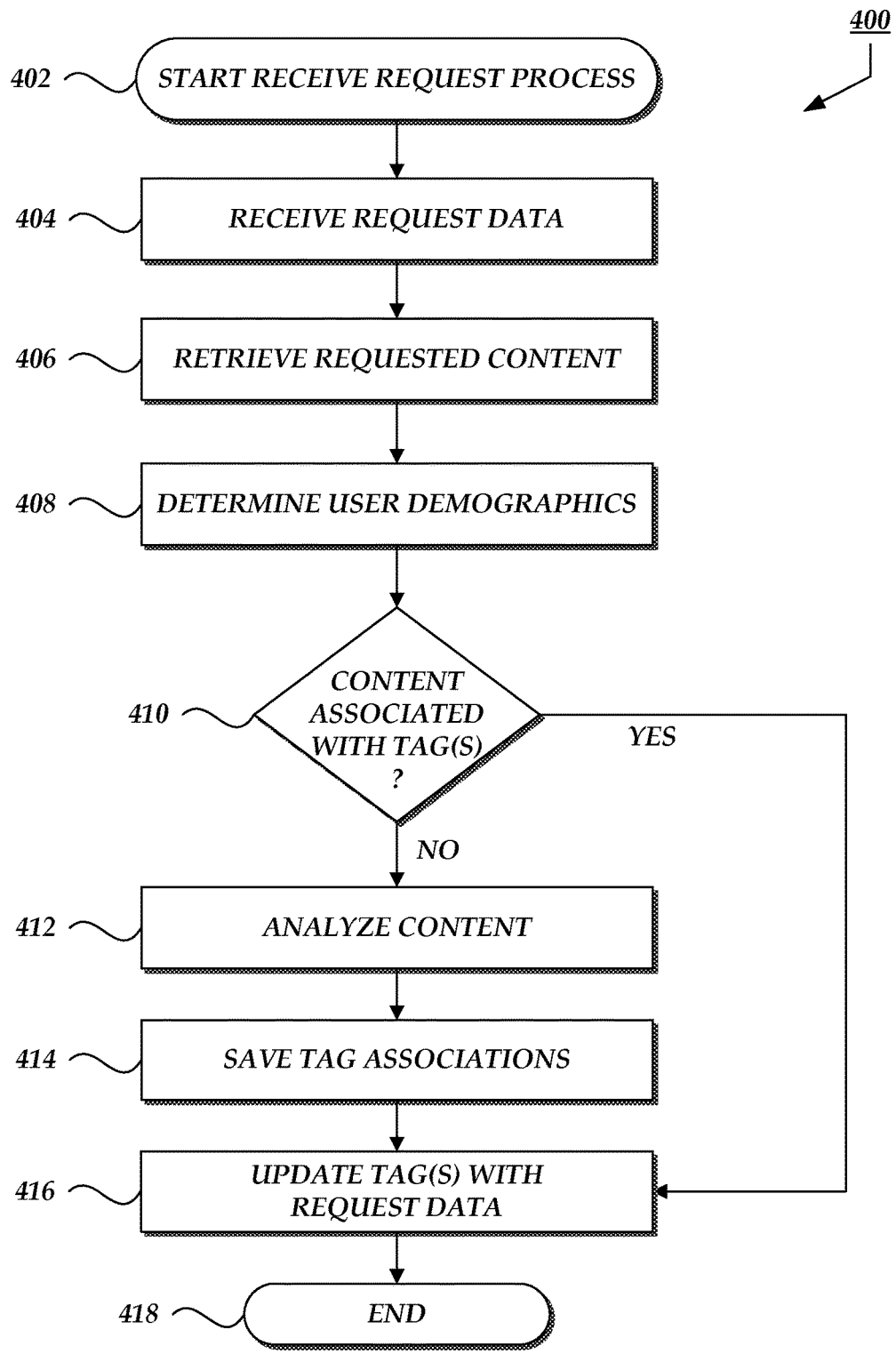
FIG. 4 is a flow diagram of an illustrative process for processing content request data and updating content request summarization data.

Turning now to FIG. 4, an illustrative process 400 for processing content requests, analyzing content, and updating tags will be described. The process 400 may be executed by the content retrieval component 120, content analysis component 122, and/or other components of the intermediary system 102 (or by a non-intermediary content request analysis server). The content retrieval component 120 can receive content requests from any number of client devices 104, retrieve the requested content on behalf of the client devices 104, and update content request counts for any tags associated the requested content. The intermediary system 102 may also monitor which tags are increasing in popularity, or "trending." If no tags are associated with the requested content, the content analysis component 122 can associate existing tags or create new tags for the requested content.

The process 400 begins at block 402. At block 404, the intermediary system 102 can receive content request data from a client device 104. The content request data may include a URL or other data that the content retrieval component 120 may use to locate and retrieve the requested content. For example, the request may include one or more cookies that the content server 106 associated with the content item previously sent to the client device 104.

At block 406, the content retrieval component 120 may retrieve the requested content from the content server 106 on behalf of the client device 104. The content may include other information, such as cookies that the content server 106 wishes to send to the client device 104. The content retrieval component 120 may transmit the requested content and other information to the client device 104. In some embodiments, the content retrieval component 120 may process the content in a content rendering engine prior to transmitting it to the client device 104.

At block 408, the content retrieval component 120 or some other component of the intermediary system 102 may determine user demographic data for the user of the requesting client device 104, if such data is available. Such demographic data may useful when later generating content request summarization report that are based on the most popular tags as requested by users of various demographic groups. The user demographics may be obtained from the user data store 130. For example, the user may have provided certain demographic data to the intermediary system 102 when associating with the intermediary system 102 for proxy, caching, or other services. The user may have a user account with the intermediary system 120 that includes demographic information such as gender, age, geographic region, interests, and other information. In some embodiments, demographic information may be incomplete or not provided by the user. In such cases, the intermediary system 102 may analyze content requests submitted by the user over time. Demographic information may be inferred by comparing the prior content requests to those of other users that have provided demographic information. In some embodiments, device characteristic data may be used instead of or in addition to user demographic data.

At decision block 410, the content retrieval component 120 may determine whether the requested content has been previously associated with tags in the URL-tag mapping data store 126. If so, the process 400 may skip to block 416. Otherwise, the process 400 may proceed to block 412. In many cases, content at a given URL may change over time, and therefore looking at the URL-tag mapping data store may not be adequate to determine whether the tags associated with the content are accurate. In such cases, the content retrieval component 120 or the content analysis component 122 may determine the extent to which a content item has changed in order to determine whether to proceed to block 412 or skip to block 416. For example, the content analysis component 122 may compare a hash of the page (or of a selected portion of the page) to a hash generated the last time the page was analyzed. In another example, the content analysis component 122 may determine how long it has been since the content at the URL was last analyzed, and proceed to analyze the content if the time period exceeds a threshold. In a further example, the content analysis component 122 may automatically analyze content items every Nth time the content item is requested, where N is a predetermined or dynamically determine integer.

At block 412, the content analysis component 122 or some other component of the intermediary system 102 may analyze the requested content in order to determine which tags of the tag data store 126 may apply, or to create new tags if no tags in the tag data store 126 apply. The content may be analyzed according to keyword association, as implemented by a number of search engines and other systems known to one of skill in the art. In some cases, a requested content page may include two or more individual content items and other information, such as advertisements, comments, and the like. Various techniques may be used to determine which content item or items on a page are to be considered when associating tags with the content page. For example, data regarding user interactions with the content page, such as zooming, scrolling, and other behaviors, may be tracked and analyzed to identify one or more content items. Other techniques, such automated analysis of the Hypertext Markup Language (HTML) code or other code that defines the page may be used to determine which areas contain the most text or are most likely to contain important content. Such areas may then be further analyzed and associated with tags as described below.

The subject matter may be determined based on keywords and other information associated with the content item, and tags may be selected from the tag data store 128. If the subject matter of the content cannot be adequately categorized by existing tags, new tags may be created. For example, if the requested content item relates to financial information of a newly formed company, a tag for the newly formed company may be created in the tag data store 128. In some embodiments, metadata embedded within the content may be inspected to determine the subject matter of the content item. In additional embodiments, natural language processing techniques may be applied to the text of the content item in order to determine the subject matter of the content item. Additional tags may be associated with the content item, such as tags related to the format (text, image, video, sound), tags related to the content source (the content provider or content server), and the like.

At block 414, the URL-tag mapping data store 126 may be updated to reflect that the content item is associated with tags determined in block 412. For example, one or more records may be saved in the URL-tag mapping data store 126 to indicate that the requested content item is associated with tags for news, financial news, a specific company, and text content. Additional data may be stored in the URL-tag mapping data store, such as the date or time that the record was last saved. Such information may be used to determine whether the URL-tag mapping record is "stale" and the content at the URL should be analyzed for potential changes and modifications to the URL-tag mapping records associated with the content.

At block 416, the tag data store 128 may be updated with data regarding the content request received at block 404. Returning to the example above, tags regarding news, financial news, and the newly formed company may be identified by inspecting the URL-tag mapping data store 126. Data may be updated or created in the tag data store 128 regarding the three tags. The data may be a count that is incremented, indicating another request. Date, time, and user demographic information may be included so that content request summarization reports based on the tag data store 128 may be more granular. In some embodiments, multiple count values may be maintained for the same tag. For example, there may be different tags for different device types, demographic categories, geographic regions, time periods, etc. In some embodiments, the tag data may also be analyzed to determine whether the tag is trending (e.g.: content items associated with the tag are being requested more often than usual). If a tag is determined to be trending, notifications may be sent, data feeds may be updated and pushed, and the like.

Figure 5:
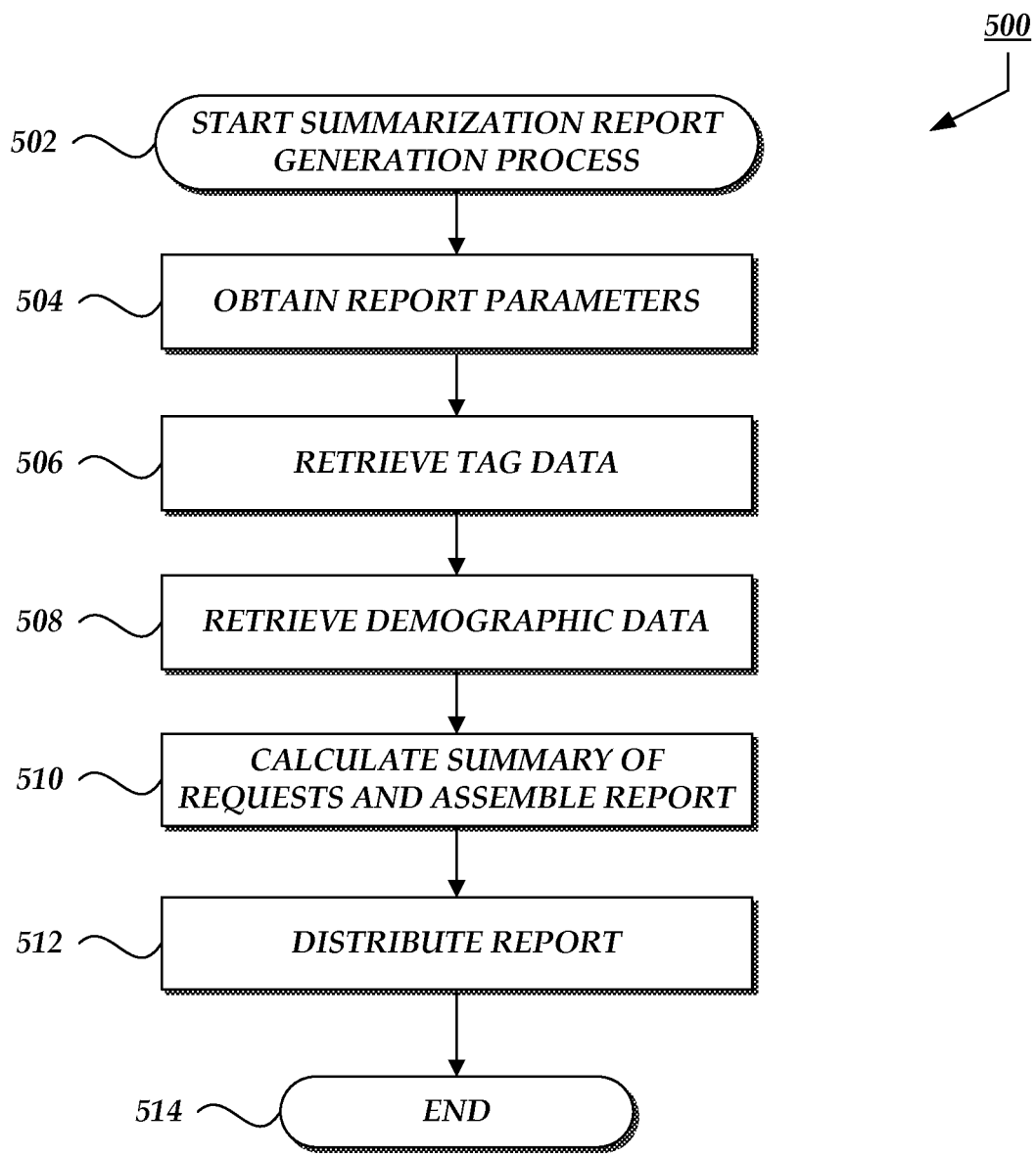
FIG. 5 is a flow diagram of an illustrative process for generating and distributing content request summarization data.

Turning now to FIG. 5, an illustrative process 500 for generating content request summarization reports will be described. The process 500 may be executed by the request analysis component 124 or some other component of the intermediary system 102 (or by a non-intermediary content request analysis server). The request analysis component 124 may receive a request for a content request summarization report from a content server 106. The request analysis component 124 may then prepare a report based on data in the tag data store 128, crated and updated as described above with respect to FIG. 4. The report may further include demographic data regarding some or all of the users that have requested content associated with the tags.

The process 500 begins at block 502. The process 500 may be initiated in response to a request from a content server 106. The request may be an on-demand request, such as a request initiated by a system administrator associated with the content server 106 or a request automatically generated by the content server 106 on a schedule or in response to a triggering event. In some embodiments, a content server 106 may request that the intermediary system 102 generate a content request summarization report on a schedule or in response to a triggering event. For example, a content server 106 may employ the intermediary system to generate a report regarding the trending or most popular tags associated with content requests from members of certain demographic group after a threshold number of such requests are received by the intermediary system 102. In some embodiments, content request summarization data is pushed or otherwise transmitted to the content server 106 as a data feed, rather than as a discrete report requested by the content server 106 or scheduled for transmission.

At block 504, the intermediary system 102 may obtain parameters regarding the content request summarization report to be produced. Parameters may specify a time period of requests to consider, a demographic group, whether to focus on trending tags or current popularity, and the like. Returning to the previous example, the parameters for one report may indicate that the report is to encompass trending tags associated with requests received within the past 12 hours from users who are female, aged 35-45, and located in urban areas. In some embodiments, trends may be determined with respect to specific characteristics of client devices 104. For example, the parameters may indicate that the report is to indicate trending tags associated with mobile phones or tablet computing devices.

At block 506, the request analysis component 124 may begin the process of generating the content request summarization report. The request analysis component 124 may retrieve data from the tag data store 128 that satisfies the report parameters obtained in block 504. Returning to the previous example, the request analysis component 124 can query or otherwise filter data in the tag data store 124 to obtain only data regarding requests received in the prior 12 hours.

At block 508, the request analysis component 124 can obtain demographic data associated with the requests, if required as part of the content request summarization report parameters. As described above, demographic data regarding the requests may also be stored in the tag data store 128. In some embodiments, demographic data is instead obtained from the user data store 130 by cross-referencing content requests with the users who have made the requests.

At block 510, the request analysis component 124 can calculate or otherwise summarize the requests associated with each tag and assemble the content request summarization report based on the tag data and demographic data obtained above. Calculating the requests may involve summing the number of requests that have been associated with each tag and that also meet the report parameters. In some embodiments, the data in the tag data store 128 may already contain the number of requests for content associated with each tag. When calculating trending tags, the number of requests associated with the tag for the time period of the currently generated report may be compared to the number of requests for a previous time period, to a graph or function representing previous requests and trends associated with the tag, and the like. The acceleration of the trend (e.g.: the rate at which requests associated with the tag are increasing) may also be determined in comparison with historical request data or with graphs and other summarizations of historical request data. The calculations made for determining trends may also estimate the number of future requests, future level of popularity, and the like. Assembling the content request summarization report may include preparing a data file or data stream to be transmitted to one or more content servers 106.

In some embodiments, the increasing rate of requests for content associated with a specific tag overall may not be as important as a difference between two groups of users in the rate of requests for content associated with the tag. For example, a tag may be trending at a relatively modest rate for a specific locality (e.g., ranked as the 100th fastest trending topic in that locality). On a statewide, nationwide, or worldwide basis, however, the same tag may be barely trending in comparison with other tags (e.g., ranked as the 50,000th fastest trending topic in the country). In such a case, the difference between the local trend rate and the national trend rate may convey important data that the raw local or national trend rate does not, such as that the topic has some particular tie with the locality, or that the topic may be in the early stages of trending at a high rate locally and soon may spread regionally or nationally, depending on the topic. One example of a system that analyzes trend data and the differences between trend data associated with groups is disclosed in U.S. Pat. No. 6,963,850, the contents of which are hereby incorporated by reference.

At block 512, the intermediary system 102 may distribute the content request summarization report to the requesting content server 106. The report may be transmitted directly to the requesting content server 106. For example, the intermediary system 102 may provide a web service interface through which reports may be requested and received. In some embodiments, the report may be hosted by the intermediary system 102 or some other system, such as a separate web server. In such cases, the content request summarization report may be available to the requesting content server 106 and optionally to other content servers 106.

As described above, content servers 106 may use the data in the content request summarization report in a number of ways. A content server 106 may automatically alter or rearrange its content offerings to highlight or otherwise emphasize content associated with more popular tags. If the content server provides query-based access to it's content, it may also use the summarization report to relevance-rank search results provided to end users. In some embodiments, a content server may also utilize demographic data. For example, a web site may provide different areas of the web site targeted at different groups of users. In such cases, the content server 106 may emphasize different content in some or all of the different areas, depending on the target user group and the data in the report. In additional embodiments, a content server 106 may customize content for individual users based on the demographic data in the report.

Figure 6:
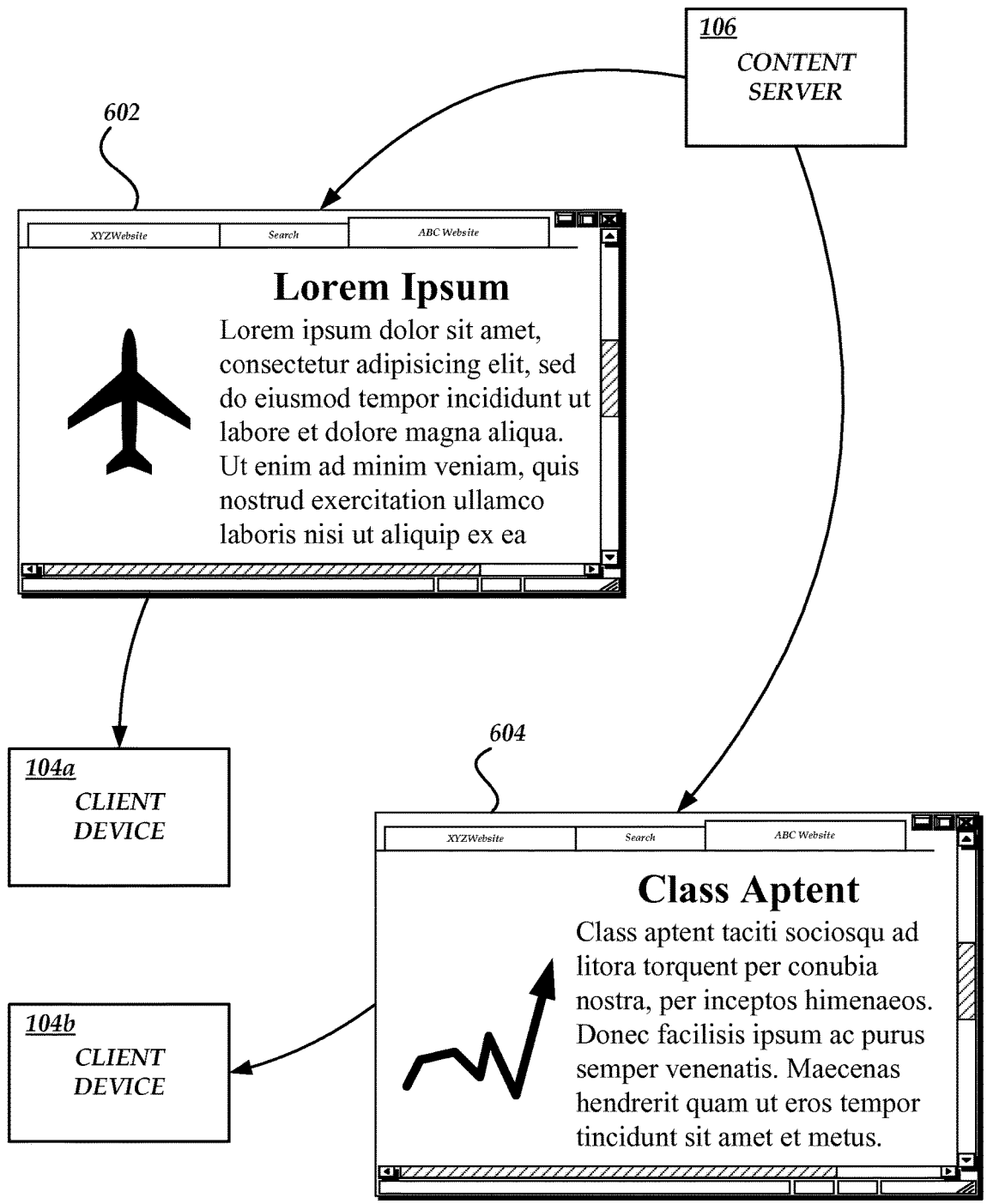
FIG. 6 is a user interface diagram of illustrative user interfaces presented to different users based on content request summarization data including demographic data.

FIG. 6 illustrates content sent from a content server 106 to two different client devices 104a, 104b. The content has been customized based on demographic data associated with users of the client devices 104a, 104b and demographic data in the content request summarization report. For example, the content server 106 may have knowledge of the users' demographic characteristics because the users may have user accounts with the content sever 106. In some cases, the content server 106 may use cookies to track certain content requests made by a user, and can infer the user's demographic data based on a comparison of such content requests to the content requests of users for which the content server 106 has access to demographic data. In these and other situations, the content server 106 may return one version of requested content to client device 104a, and a different version of the requested content to client device 104b. For example, the content request summarization report may indicate that users in New York have most often requested content tagged as financial news in the past 12 hours, while users in California have most often requested content tagged as world news. Upon determining that the user of client device 104a is in California, the content server 106 may transmit a landing page featuring a world news article. Upon determining that the user of client device 104b is in New York, the content server 106 may transmit a landing page featuring a financial news article.

In some embodiments, the demographic data may include data regarding client devices 104 utilized by users submitting content requests, as described above. The content request summarization report may reflect such device-specific demographic data. For example, a tag such as restaurant reviews may be associated with content requests received from mobile phones more often than other types of client devices 104. Accordingly, the content server 106 may format restaurant reviews for viewing via a mobile phone.

As will be recognized, the tag-related data (URL-tag mappings, tag count values, etc.) captured by the intermediary system 102 may also be used in various other ways. As one example, the intermediary system may include an API or service interface through which content providers, including advertisers, can make real time requests for the tags most closely associated with particular user requests. For example, when an ad server receives a request to deliver an ad for display on a particular page on a particular user device, the ad server could query the intermediary system for a list of the page's tags that are currently the most popular among users generally or among a particular class of user or user device. The ad server could then use this list of tags to select an ad to deliver. Alternatively, the intermediary system could itself act as an ad server which uses the collected tag-related data to select ads to insert on the pages it retrieves and delivers to client devices 104. As another example, the intermediary system 102 could use the collected tag-related data to directly provide personalized content, such as personalized starting pages, to users of the client devices 104.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

For example, each of the processes described with respect to FIGS. 4 and 5 may be embodied in a set of executable program instructions stored on a computer-readable medium, such as one or more disk drives, of the computing system with which the intermediary system is associated. When the processes are initiated, the executable program instructions can be loaded into memory, such as RAM, and executed by one or more processors of the computing system. In some embodiments, the computing system may include multiple computing devices, such as servers, and the processes may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for identifying trending content topics, the system comprising:
an intermediary system comprising one or more processors and a computer-readable memory, the intermediary system configured to operate as an intermediary between client devices and content sites; and
executable instructions stored in the computer-readable memory, wherein the one or more processors are programmed by the executable instructions to at least:
process a plurality of content requests from a plurality of the client devices, wherein each content request of the plurality of content requests corresponds to a content item of a plurality of content items, and wherein at least two content items of the plurality of content items are hosted by different content sites, said processing comprising retrieving the content items from the content sites and providing the content items to the client devices;
associate one or more topics, of a plurality of topics, with each content item of the plurality of content items based at least in part on a keyword analysis of the content item, wherein each topic is represented by a respective tag in a mapping table that maps Uniform Resource Locators of content items to corresponding tags;
generate count values for specific topics of the plurality of topics based on (1) the content requests and (2) the topics associated with corresponding content items, each count value corresponding to a respective topic and representing a measure of how often content items associated with the respective topic are requested, wherein generating the count values comprises maintaining at least first and second count values for a topic, the first count value corresponding to a first geographic region and representing a count of requests made by users in the first geographic region, the second count value corresponding to a second geographic region and representing a count of requests made by users in the second geographic region; and generate, based on the count values, topic trend data reflecting topics associated with an increasing volume of content requests, wherein generating the topic trend data comprises using the count values to determine geographic-region-specific rates of change in popularity of particular topics.

2. The system of claim 1, wherein the one or more processors are further programmed to:

obtain demographic data regarding a user of a first client device of the plurality of client devices, wherein request data regarding a request received from the first client device is associated with the demographic data, and wherein the topic trend data further reflects demographic data regarding one or more users of the plurality of client devices.

3. The system of claim 1, wherein the one or more processors are further programmed to:

obtain device data regarding one or more characteristics of a first client device of the plurality of client devices, wherein request data regarding a request received from the first client device is associated with the device data, and wherein the topic trend data further reflects the device data regarding one or more client devices.

4. The system of claim 1, wherein the one or more processors are further programmed to transmit the topic trend data to a content provider as a data feed.

5. The system of claim 1, wherein the one or more processors are further programmed to provide the topic trend data to a content provider in response to a request from the content provider.

6. An intermediary system comprising one or more computing devices, said intermediary system programmed via executable program instructions to implement a process that comprises:

receiving requests from user devices for content pages hosted by content servers;

retrieving the requested content pages from the content servers on behalf of the user devices, and delivering the retrieved content pages to the user devices in fulfillment of said requests;

determining, based on an analysis of content of the retrieved content pages, topics associated with the retrieved content pages, wherein each topic is represented by a respective tag in a mapping table that maps Uniform Resource Locators of content pages to corresponding tags; and generating topic trend data based at least partly on a volume of the received requests for content pages and the determined topics associated with the retrieved content pages, said topic trend data indicating trends associated with particular topics, wherein generating the topic trend data comprises maintaining, for at least a first topic, topic-specific count values representing a measure of how often content pages associated with the first topic are requested over respective periods of time, and using the topic-specific count values to determine a rate of change in popularity of the first topic;

wherein generating the topic-specific count values comprises maintaining at least first and second count values for a topic, the first count value corresponding to a first geographic region and representing a count of requests made by users in the first geographic region, the second count value corresponding to a second geographic region and representing a count of requests made by users in the second geographic region;

wherein generating the topic trend data comprises using the count values to determine geographic-region-specific rates of change in popularity of particular topics.

7. The intermediary system of claim 6, further comprising providing said topic trend data to at least one content provider as a data feed.

8. The intermediary system of claim 6, wherein generating the topic trend data comprises using device data regarding the user devices associated with particular page requests to determine device-type-specific topical trends.

9. The intermediary system of claim 6, wherein generating the topic trend data comprises using demographic data associated with at least some of the user devices to determine demographic-category-specific topical trends.

10. The intermediary system of claim 6, wherein the topic trend data comprises an identifier of a content page associated with a topic.

11. The intermediary system of claim 6, wherein the process further comprises generating a mapping table that maps URLs to topics based on the analysis of the retrieved pages, and wherein generating the topic trend data comprises using the mapping table to look up topics associated with specific URLs.

12. The intermediary system of claim 6, wherein generating the topic trend data comprises determining, for the first topic, a rate of change in requests for content pages corresponding to the first topic.

13. The intermediary system of claim 6, wherein determining the topics associated with the retrieved content pages comprises assigning a textual tag to each of a plurality of retrieved content pages based on keyword analyses of the retrieved content pages, the textual tag representing a particular topic.

14. A computer-implemented process, comprising:

assigning a topic to each of a plurality of content items, including content items of different respective content sites, based at least partly on keyword analyses of the content items, wherein each topic is represented by a respective tag in a mapping table that maps Uniform Resource Locators of content items to corresponding tags;

by an intermediary system that serves as an intermediary between user devices and content sites, processing requests from the user devices for the content items by retrieving the content items from the content sites and providing the content items to the user devices;

generating trend data for the topic based on the requests from the user devices for the content items, wherein generating the trend data comprises maintaining, for the topic and for each of a plurality of periods of time, a count value representing a count of said requests received over the respective period of time, and using the count values to measure a rate of change of popularity of the topic;

wherein generating the trend data further comprises maintaining at least first and second count values for the topic, the first count value corresponding to a first geographic region and representing a count of requests made by users in the first geographic region, the second count value corresponding to a second geographic region and representing a count of requests made by users in the second geographic region, and using the first and second count values to determine geographic-region-specific rates of change in popularity of the topic;

said process performed by execution of program code by one or more processors.

15. The method of claim 14, wherein the process further comprises generating the mapping table based on keyword analyses of the content items.

16. The method of claim 14, wherein generating the trend data for the topic comprises generating, for the topic, multiple count values that each correspond to a different respective user device classification.

* * * * *